United States Patent
VanWiggeren

(10) Patent No.: US 6,943,891 B2
(45) Date of Patent: Sep. 13, 2005

(54) DETERMINING OPTICAL CHARACTERISTICS OF OPTICAL DEVICES UNDER TEST

(75) Inventor: Gregory D. VanWiggeren, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 601 days.

(21) Appl. No.: 10/098,284

(22) Filed: Mar. 15, 2002

(65) Prior Publication Data

US 2003/0174337 A1 Sep. 18, 2003

(51) Int. Cl.[7] .............................................. G01B 9/02
(52) U.S. Cl. ...................................................... 356/477
(58) Field of Search ............................. 356/73.1, 477, 356/479, 480, 481, 491, 517; 385/11, 12, 13, 14, 15

(56) References Cited

U.S. PATENT DOCUMENTS

| 4,750,833 A | * | 6/1988 | Jones .......................... 356/73.1 |
| 5,717,489 A | * | 2/1998 | Ozeki et al. ................. 356/364 |
| 5,852,496 A | * | 12/1998 | Gisin et al. .................. 356/477 |
| 6,606,158 B2 | * | 8/2003 | Rosenfeldt et al. ......... 356/477 |

FOREIGN PATENT DOCUMENTS

EP          1 113 250        7/2001

OTHER PUBLICATIONS

Heffner, B.L., "Automated Measurement of Polarization Mode Dispersion Using Jones Matrix Eigenanalysis," IEEE Photonics Technology Letters, vol. 4, No. 9, Sep. 1992, pp. 1066–1069.

Nyman, Bruce M. and Wolter, Gregory, "High–Resolution Measurement of Polarization Dependent Loss," IEEE Photonics Technology Letters, vol. 5, No. 7, Jul. 1993.

Schmidt, Siegmar and Hentschel, Christian, "PDL Measurements Using the HP 8169A Polarization Controller," Hewlett–Packard Company 1996, 1997.

* cited by examiner

*Primary Examiner*—Samuel A. Turner
*Assistant Examiner*—Michael A. Lyons

(57) ABSTRACT

Systems, methods, computer-readable media for determining optical characteristics, such as polarization mode dispersion and/or polarization dependent loss, of device under test (DUTs) are provided. In this regard, one such system includes a response analyzer that receives data corresponding to responses of a DUT to optical signals. The response analyzer computes fast and slow group delays corresponding to at least some of the optical signals, each of the fast and slow group delays being attributable to one of a first and a second principle state of polarization. The response analyzer then assigns each of the fast and slow group delays to a correct one of the first and second principle states of polarization for at least some of the optical signals.

45 Claims, 9 Drawing Sheets

DETERMINING OPTICAL CHARACTERISTICS OF OPTICAL DEVICES UNDER TEST

FIELD OF THE INVENTION

The present invention generally relates to optics. More specifically, the invention relates to systems and methods for determining optical characteristics, such as polarization mode dispersion and polarization dependent loss, of optical devices under test.

DESCRIPTION OF THE RELATED ART

Polarization mode dispersion (PMD) is a property of optical systems, such as singlemode optical fiber, in which signal energy at a given wavelength is resolved into two orthogonal polarization modes of different propagation velocity. Each of the polarization modes is called a principle state of polarization (PSP), the resulting difference in propagation time between the PSPs being called the differential group delay (DGD).

Jones matrix eigenanalysis (JME) has been used to determine PMD. In particular, JME determines DGD and PSP as functions of wavelength from measurements of a transmission matrix at a series of wavelengths. See, for example, B. L. Heffner, "Automated Measurement of Polarization Mode Dispersion Using Jones Matrix Eigenanalysis," IEEE Photonics Tech. Letter, Vol. 4, September 1992 (1066–1069), which is incorporated by reference herein. There are, however, at least two practical problems involved with the application of JME.

First, use of JME, as described by Heffner, results in a phase ambiguity that prevents the actual group delay of each of the two PSPs from being determined. Second, the mathematical analysis for calculating group delays can fail when applied to measurements in which the noise level of the measurements is of the same order as the DGD. In such a situation, the noisy nature of the measurements can prevent the algorithm from being able to distinguish properly between the two PSPs.

Based on the foregoing, it should be appreciated that there is a need for improved systems and methods that address these and/or other perceived shortcomings of the prior art.

SUMMARY OF THE INVENTION

The present invention involves determining optical characteristics, such as polarization mode dispersion (PMD) and polarization-dependent loss, of a device under test (DUT). In determining the optical characteristics, the responses of a DUT to various wavelengths of light are measured. The effect of noise on the measurements then can be reduced by filtering data corresponding to the measurements. By way of example, with respect to those embodiments that determine PMD of a DUT, the filtering can enable the first and second principle states of polarization (PSPs) to be distinguished from each. This can enable each of the fast and slow group delays of the DUT to be assigned the correct one of the first and second PSPs, even if the noise exhibits an order of magnitude comparable to an order of magnitude of the differential group delay of the DUT.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As will be described in greater detail here, the present invention involves determining optical characteristics of devices under test (DUTs). In particular, embodiments of the invention can enable at least one of polarization mode dispersion (PMD) and polarization dependent loss (PDL) to be determined.

Determining PMD

Figure 1:
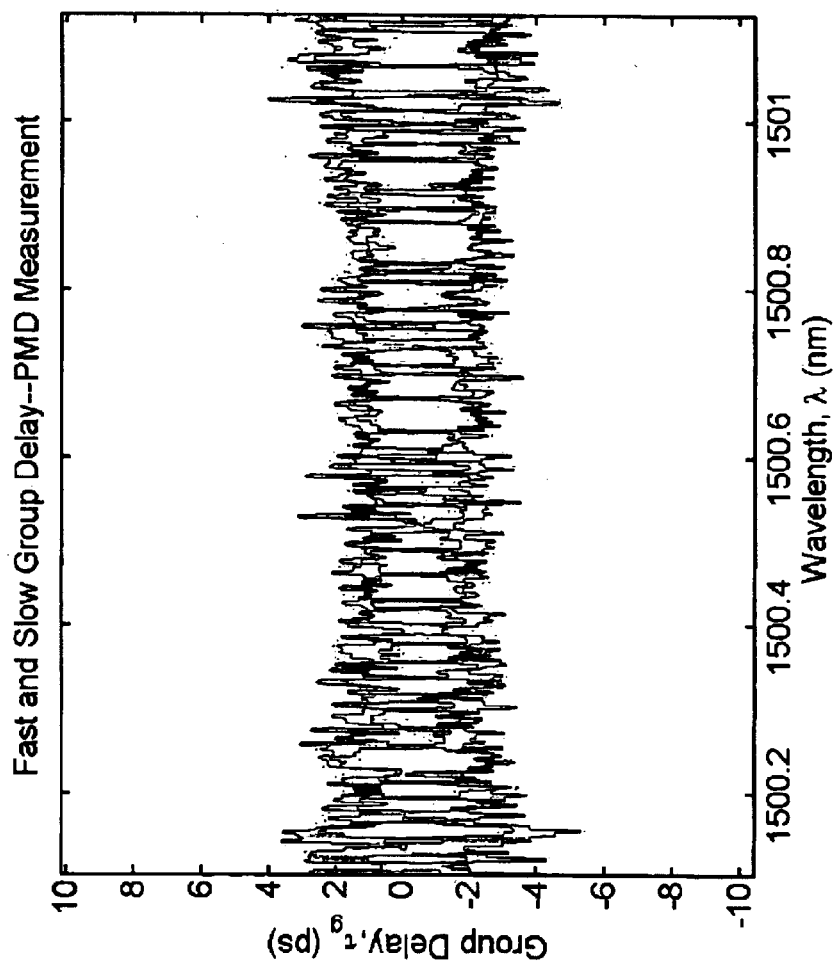
FIG. 1 is a graph depicting a PMD measurement for a length of polarization-maintaining optical fiber.

FIG. 1 is a graph depicting a PMD measurement (Group Delay versus Wavelength) for a length of polarization-maintaining (PM) optical fiber. In FIG. 1, the red line corresponds to the group delays assigned to one measured principle state of polarization (PSP), while the blue line corresponds to the group delays assigned to the other PSP. Note, birefringence in the PM optical fiber results in the difference in the group delays.

The actual group delay values of FIG. 1 have been plotted relative to an arbitrary baseline ("0" ps) and, therefore, do not represent the actual group delays of the PM optical fiber. Note, the actual group delays of a given PSP should not alternate between the high level (approximately 2 ps) and the low level (approximately −2 ps) depicted in the graph. Thus, due at least in part to the noise level of the measurements being large relative to the difference between the group delays, i.e., the differential group delay (DGD), the PMD depicted clearly is incorrect. This is because the noise has prevented the proper assignment of the group delays to the PSPs.

Figure 2:
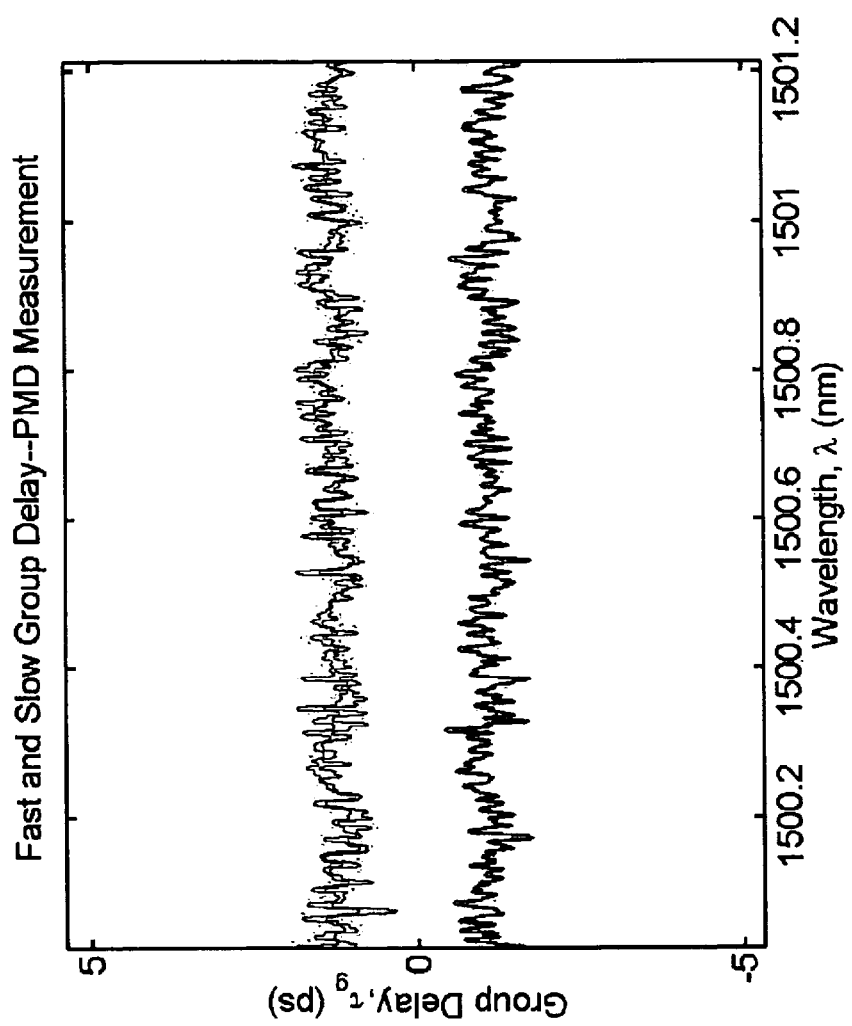
FIG. 2 is a graph depicting a PMD measurement constructed using an embodiment of the present invention.

In contrast, FIG. 2 depicts a PMD measurement for the length of PM optical fiber referred to in FIG. 1 that is constructed using an embodiment of the present invention. In FIG. 2, the red line corresponds to the group delays for one measured PSP, while the blue line corresponds to the group delays of the other measured PSP. Note, the group delays of a given PSP of FIG. 2 no longer incorrectly alternate between the high level (approximately 2 ps) and the low level (approximately −2 ps) as was the case in FIG. 1.

Figure 3:
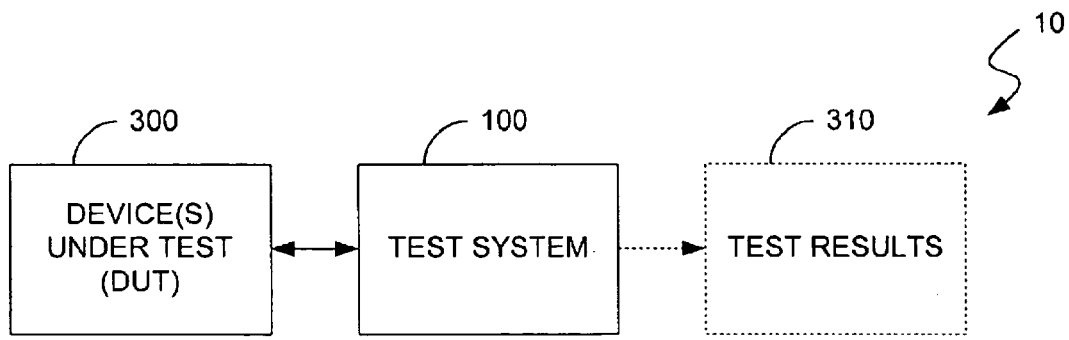
FIG. 3 is a schematic diagram of an embodiment of an optical system of the present invention.

FIG. 3 is a schematic diagram of an embodiment of an optical system 10 of the present invention that can be used to provide PMD measurements, such as depicted in FIG. 2. As shown in FIG. 3, optical system 10 includes a test system 100. The test system 100 communicates with DUT 300. The test system typically provides test signals to the DUT and receives DUT responses in response to those signals. Data corresponding to the test signals and the responses then is used to produce test results 310. By way of example, the test results can include data relating to the PMD of the DUT. In some embodiments, the test system can provide data in graphical form, such as depicted in FIG. 2.

Figure 4:
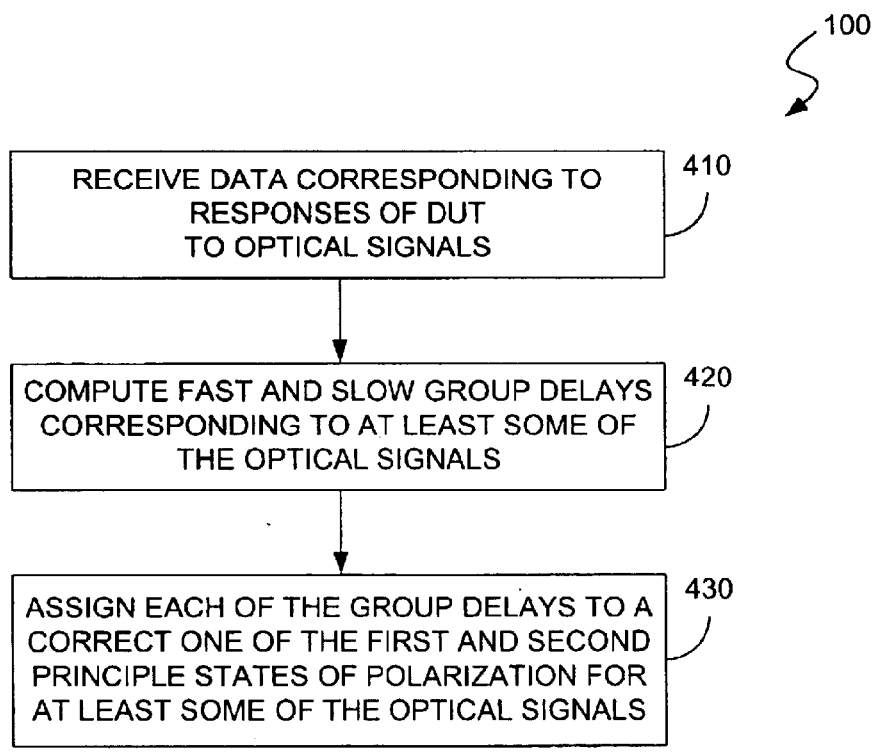
FIG. 4 is a flowchart depicting functionality that can be associated with the test system of FIG. 3.

Functionality of the embodiment of the optical system 10 and, in particular, test system 100 of FIG. 3 will now be described with reference to the flowchart of FIG. 4. As shown in FIG. 4, the functionality or method 100 may be construed as beginning at block 410, where data corresponding to responses of the DUT to optical signals is received. In block 420, fast and slow group delays corresponding to at least some of the optical signals are computed using the data received. Note, each of the fast and slow group delays is attributable to one of the first and second PSPs. In block 430, each of the fast and slow group delays is assigned to a correct one of the first and second PSPs for at least some of the optical signals. Differential group delays (DGDs) of the DUT also can be determined using the fast and slow group delays.

Various techniques can be used to determine the PMD, e.g., the fast and slow group delays, the first and second PSPs and/or DGDs of a DUT. By way of example, a series of Jones matrices can be determined, each of which corresponds to the polarization-resolved transfer function of the DUT at a specific wavelength.

In this regard, a Jones matrix of a DUT represents the linear operation of the DUT on light. In particular, the Jones matrix describes the effect of the DUT on the phase, amplitude, and polarization of optical signals that are provided to the DUT.

A transfer matrix, T, is as follows:

$$T = e^{i\phi}\begin{pmatrix} u_{11} & u_{12} \\ u_{21} & u_{22} \end{pmatrix} = e^{i\phi}\underline{U}, \quad (1)$$

where $\underline{U}$ is the Jones matrix. Using Jones matrix eigenanalysis (JME), the DGD of the PSPs is described by the equation:

$$DGD = \lambda_- - \lambda_+ \quad (2)$$

where $\lambda_-$ is the slow group delay and $\lambda_+$ is the fast group delay, and where, $$\lambda_{+,-} = Im\{eig\{T^{-1}dT/d\omega\}\} \quad (3)$$

Here, $d\underline{T}/dw$ represents the derivative with respect to frequency of the matrix $\underline{T}$. Thus, the DGD is the difference between the two imaginary components of the eigenvalues of the matrix $\underline{T}^{-1} d\underline{T}/d\omega$.

Mathematically, the description given above is quite correct. However, for Jones matrices obtained through measurements, noise associated with the measurements adds a complication. Consider, for example, a DUT that exhibits group delays $\lambda_+$ and $\lambda_-$, with roughly 4 ps of noise fluctuations over a range of wavelengths. Also assume that the DUT is known to exhibit a DGD of 1 ps over the same range of wavelengths. One approach for attempting to determine the average magnitude of the DGD is to calculate the DGD at each wavelength and then average the calculated values over the wavelength range. This approach, however, results in a calculated magnitude for the DGD over the wavelength range of ~4 ps. This is a significant error compared to the actual 1 ps value.

Recall that an eigenvector representing the PSP of the DUT is associated with each eigenvalue. Mathematically, the DGD can be calculated as the difference of the eigenvalues associated with the PSPs, i.e., $PSP_+(\lambda_+)$ and $PSP_-(\lambda_-)$. This enables the measurement problem described above to be overcome by assigning each calculated eigenvalue to the proper PSP before averaging occurs. However, the same measurement noise can lead to uncertainty in the determination of $PSP_+$ and $PSP_-$. In practice, this means that errors can be made in distinguishing the two PSPs, especially for cases in which the DGD is relatively small, e.g., of the same order as the noise. An example of this effect was described previously with respect to FIG. 1. The invention described here is capable of alleviating this problem.

In this regard, embodiments of the test system of the present invention perform filtering of phase and amplitude data associated with DUT responses to optical signals. By filtering at least some of the data associated with DUT responses, the effect of noise can be mitigated. More specifically, the reduction in the effect of the noise potentially enables embodiments of the invention to more correctly distinguish between $PSP_+$ and $PSP_-$, particularly with respect to DUTs in which the DGD is of the order of the magnitude of the measurement noise on $\lambda_+$ and $\lambda_-$. Typically, the reduction in noise-level is provided at the expense of wavelength resolution.

For example, in those embodiments using Jones matrices, filtering of at least some of the phase and amplitude data can be accomplished before eigenvalues and eigenvectors are calculated. For instance, in some embodiments, the test systems calculate average values for at least some of the elements of $\underline{T}$ and/or $d\underline{T}/d\omega$ before attempting to calculate eigenvalues and eigenvectors of $\underline{T}^{-1} d\underline{T}/d\omega$. This can reduce the noise-level inherent in the resulting calculations of PSPs and DGDs.

In other embodiments, a PSP at a particular wavelength can be compared to one or more previously calculated PSPs to determine the proper assignment of the measured PSP.

Note, although use of Jones matrices has been particularly described here, determining values associated with optical characteristics of a DUT can be accomplished by other mathematical approaches. For example, Mueller matrices can be used. Use of Mueller matrices for determining polarization dependent loss is described in B. M. Nyman and G. Wolter, "High-Resolution Measurement of Polarization Dependent Loss," IEEE Phot. Tech. Lett. 5, 817–818 (1993); and, S. Schmidt and C. Henschel, "PDL Measurements using the HP 8169A Polarization Controller," Agilent Technologies, PN 5964–9937E, both of which are incorporated herein by reference.

As will be described in detail next, test systems of the invention can be implemented in software, firmware, hardware, or a combination thereof. When implemented in hardware, such a test system can be implemented with any or a combination of various technologies.

When implemented in software, test system 100 can be and/or can include a program that is executable by a computer or processor-based device. An example of a computer that can implement a test system, such as test system 100 of FIG. 3, is shown schematically in FIG. 5.

Figure 5:
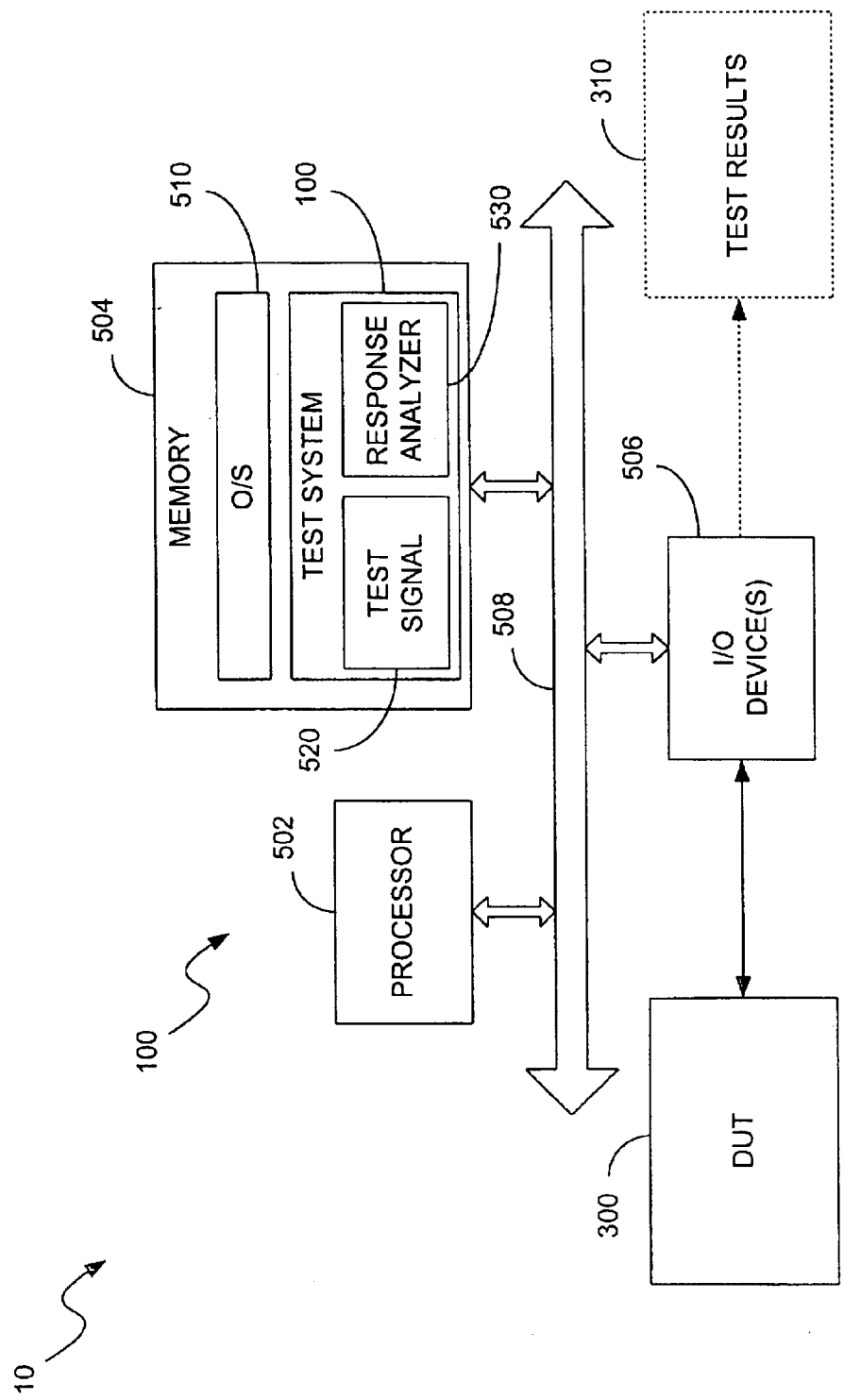
FIG. 5 is a schematic diagram of an embodiment of a test system that can be used to implement the functionality of FIG. 4.

Generally, in terms of hardware architecture, computer 500 of FIG. 5 includes a processor 502, memory 504, and one or more input and/or output (I/O) devices 506 that are communicatively coupled via a local interface 508.

Processor 502 can be a hardware device configured to execute software that can be stored in memory 504. Additionally, memory 504 can include any combination of volatile memory elements and/or nonvolatile memory elements. Moreover, memory 504 can incorporate electronic, magnetic, optical, and/or other types of storage media. Note that memory 504 can have a distributed architecture, where various components are situated remote from one another, but can be accessed by processor 502.

The software in memory 504 can include one or more separate programs, each of which comprises an ordered listing of executable instructions for implementing logical functions. The software in the memory 504 includes test system 100, which includes test signal generator module 520 and response analyzer module 530. The test signal generator module 520 provides control signals to a test signal generator that may be provided as a portion of the test system. Specifically, the test signal generator receives the control signals and provides optical signals of selected wavelengths to the DUT. Embodiments of the response analyzer module 530 will be described in detail later.

The software also includes an operating system 510 that controls the execution of other computer programs, such as test system 100. Operating system 510 also provides scheduling, input-output control, file and data management, memory management, and communication control and related services.

The I/O device(s) 506 can include an input device such as a keypad, an output device such as a display device, and/or a device that is configured to communicate both inputs and outputs such as a communication port. With respect to the system 10 of FIG. 5, I/O device(s) 506 is configured to communicate test signals to DUT 300 and/or receive DUT responses. Optionally, test results 310 and/or other information can be provided from the computer 500 via the I/O device(s).

When test system 100 is implemented in software, it should be noted that the test system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Thus, a computer-readable medium can be, for example but not limited to, an electronic, magnetic, optical, electromagnetic, infrared, or semiconductor system, apparatus, device, or propagation medium.

Reference will now be made to the flowchart of FIG. 6, which depicts the functionality of an embodiment of a test system, such as test system 100 of FIG. 5, of the invention. In this regard, each block of the flowchart represents a module segment or portion of code that includes one or more executable instructions for implementing the specified logical function(s). It should also be noted that in some alternative implementations the functions noted in various blocks of FIG. 6, or any other of the accompanying flowcharts, may occur out of the order in which they are depicted. For example, two blocks shown in succession in FIG. 6 may, in fact, be executed substantially concurrently. In other embodiments, the blocks may sometimes be executed in the reverse order depending upon the functionality involved.

Figure 6:
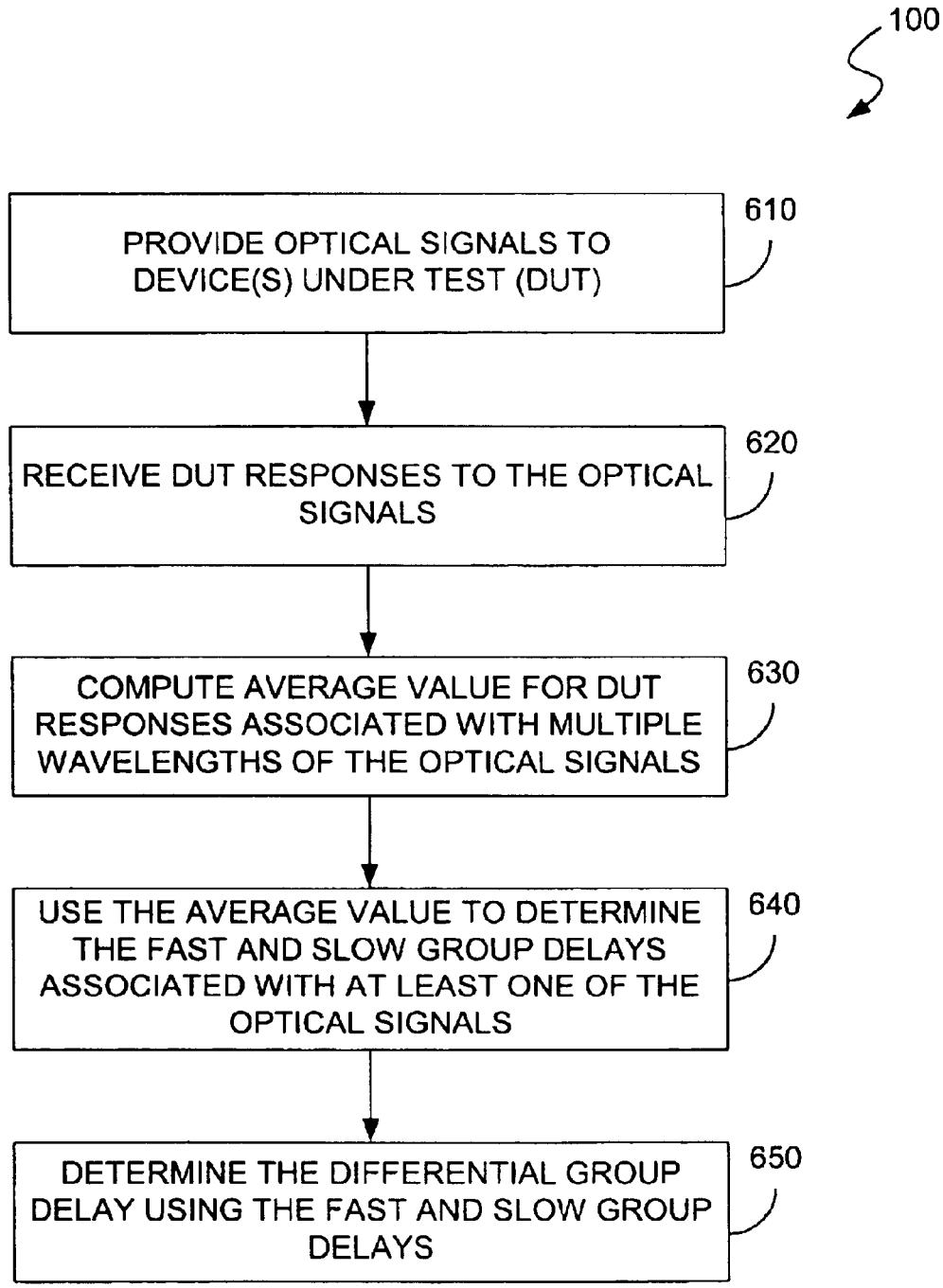
FIG. 6 is a flowchart depicting functionality that can be associated with the test system of FIG. 3.

As shown in FIG. 6, the functionality of an embodiment of the test system (or method) 100 may be construed as beginning at block 610, where optical signals are provided to a DUT. In block 620, the DUT responses to the optical signals are received. In block 630, an average value is computed that corresponds to the phases and amplitudes associated with multiple wavelengths of optic signals. Thereafter, such as depicted in block 640, the average values are used to determine the fast and slow group delays associated with one of the optical signals. In block 650, the differential group delay of the optical signal is determined using the fast and slow group delays.

By way of example, values corresponding to a particular element of a Jones matrix can be averaged over several wavelengths. The average value then can be used for that Jones matrix element. In some embodiments, the values corresponding to multiple elements of a Jones matrix can be average values calculated over multiple wavelengths. Note, the wavelengths over which an average value is calculated for one element need not be the same wavelengths over which an average value is calculated for another element.

Figure 7:
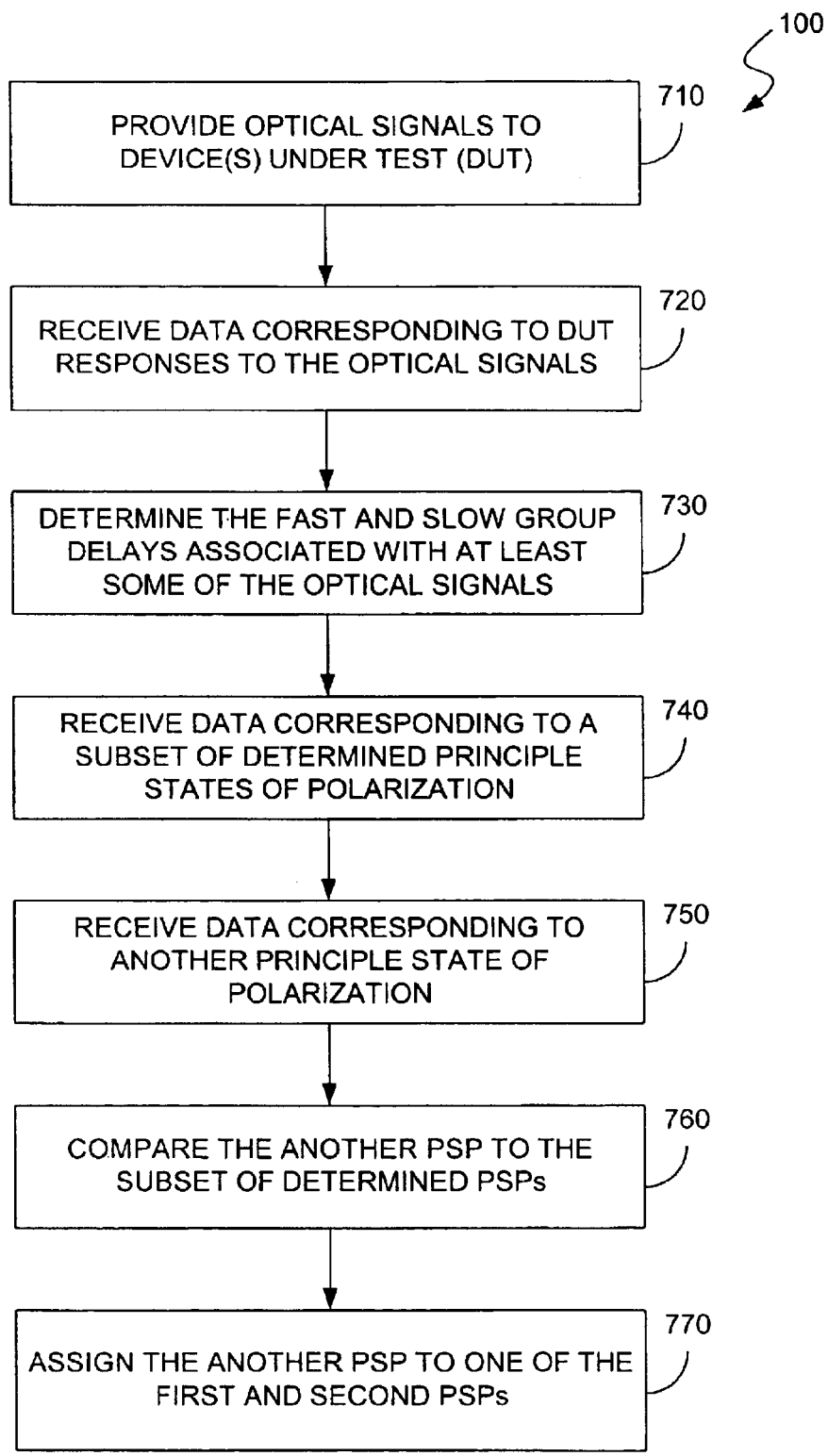
FIG. 7 is a flowchart depicting functionality that can be associated with the test system of FIG. 3.

Functionality of another embodiment of the test system is depicted in FIG. 7. As shown in FIG. 7, the functionality or method 100 may be construed as beginning at block 710, where optical signals are provided to a DUT. In block 720, the DUT responses to the optical signals are received. In block 730, the fast and slow group delays associated with at least some of the optical signals are determined. Proceeding to block 740, data corresponding to a subset of determined PSPs is received. In block 750, another PSP, e.g., a measured eigenvector, is received. Then, in block 760, the measured PSP is compared to the subset of previously measured PSPs. Based on a relationship between the measured PSP and the subset of previously measured PSPs, the PSP is assigned to one of the first and second PSP, as depicted in block 770.

Comparing the measured eigenvector to the eigenvector(s) associated with one or more previously measured PSPs can enable proper PSP assignment since the eigenvectors tend to evolve over wavelength scales that are larger than the wavelength difference between sequential measured PSPs. Stated differently, since wavelength resolution typically is high, i.e., many wavelength data points corresponding to the DUT response are acquired, the eigenvectors tend to evolve slowly between adjacent data points. For instance, eigenvectors associated with a previously determined PSP can be compared to the measured eigenvectors associated with measurements of another wavelength. Assignment of each of the measured eigenvectors then can be accomplished by determining which one of the eigenvectors more closely aligns with the previously determined first PSP and/or which of the eigenvectors more closely aligns with the previously determined second PSP.

In some embodiments, a "moving window" approach is used. In such an embodiment, eigenvectors assigned to the first PSP and/or the second PSP are averaged over a range of wavelengths. Assignment of each of the measured eigenvectors then can be accomplished by determining which one of the eigenvectors more closely aligns with the averaged first PSP and/or which of the eigenvectors more closely aligns with the averaged second PSP.

Figure 8:
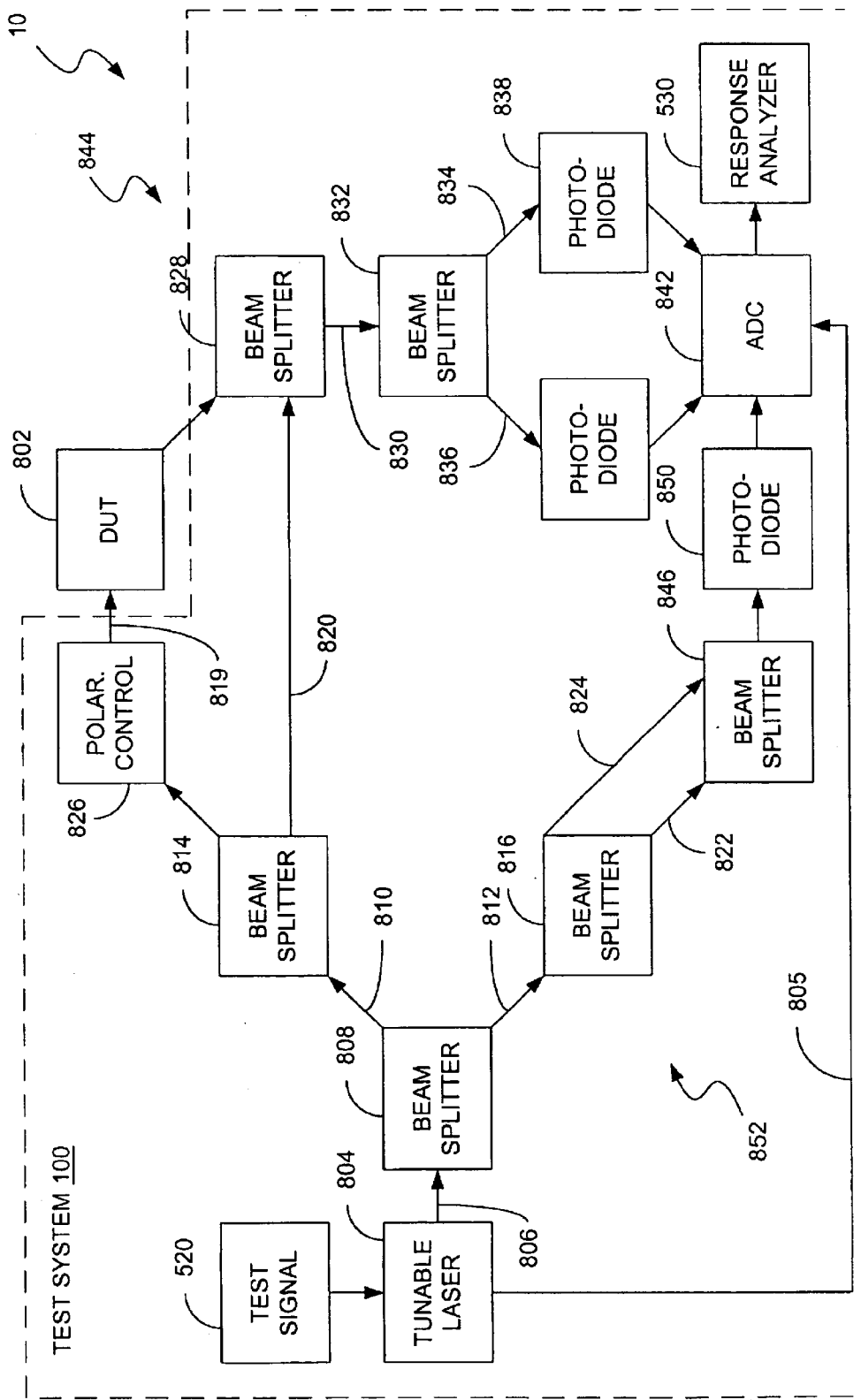
FIG. 8 is a schematic diagram of another embodiment of a test system that can be used to implement the functionality of FIG. 4.

Reference will now be made to FIG. 8, which schematically depicts an embodiment of a test system 100 that can be used for interferometric determination of the frequency-dependent Jones matrix of a DUT 802. As shown in FIG. 8, test system 100 includes a tunable laser 804 as a signal source that can be continuously tuned in respect of frequency. Based on control signals provided by test signal 520, the laser 804 emits a coherent laser beam 806.

Laser beam 806 is coupled into a first beam splitter 808 that splits the coherent laser beam 806 into a first incoming beam 810 and a second incoming beam 812. The first incoming beam 810 is coupled into a second beam splitter 814. The second incoming beam 812 is coupled into a third beam splitter 816. The second beam splitter 814 splits the first laser beam 810 into a third laser beam 818 and a fourth laser beam 820. The third beam splitter 816 splits the second laser beam 812 into a fifth laser beam 822 and a sixth laser beam 824.

The third laser beam 818 is coupled into a polarization controller 826. By passing the polarization controller 826, the laser beam (now denoted by 819), is adjusted in its polarization and is coupled into the DUT 802. After propagating through the DUT 802, the laser beam 819 is reunited with the fourth laser beam 820. Note, the optical distance traveled by the fourth laser beam 820 from the second beam splitter 814 to the fourth beam splitter 828 is different than the optical distance traveled by the third laser beam 818 and the polarized laser beam 819 from the second beam splitter 814 to the fourth beam splitter 828.

At the fourth beam splitter 828, the polarized laser beam 819 and the fourth laser beam 820 are superimposed to produce interference resulting in the first superimposed laser beam 830. The first superimposed beam 830 is then coupled into a polarization beam splitter 832 that splits the first superimposed beam 830 into a seventh beam 834 and an eighth beam 836. Beam 834 is coupled into a first photodiode 838, and beam 836 is coupled into a second photodiode 840. Note, the polarization beam splitter 832, first photodiode 838 and second photodiode 840 form a polarization diversity receiver. First photodiode 838 and second photodiode 840 transmit their outputs to an analog/digital-converter (ADC) 842 that communicates data to a response analyzer 530.

The second beam splitter 814, third laser beam 818, polarized laser beam 819, fourth laser beam 820 and fourth beam splitter 828 form a Mach-Zehnder interferometer 844. The third laser beam 818 and the polarized laser beam 819 form a measurement arm of the Mach-Zehnder interferometer 844. The fourth laser beam 820 forms a reference arm of the Mach-Zehnder interferometer 844. Note that the DUT 802 is located in the measurement arm of the Mach-Zehnder interferometer 844.

The fifth laser beam 822 and the sixth laser beam 824 travel different optical distances before being superimposed with a fifth beam splitter 846. In this embodiment, beam 824 travels a longer distance due to optical loops 825. Exiting the fifth beam splitter 846 is a second superimposed beam 828 that is detected by a third photodiode 850. The third photodiode 850 outputs a signal to the analog-to-digital converter (ADC) 842.

The third beam splitter 816, the fifth laser beam 822, the sixth laser beam 824 and the fifth beam splitter 846 form a reference interferometer 852 to the measurement interferometer 844. This reference interferometer 852 helps eliminate a possible nonlinearity in time of the tuning velocity of the laser 804. For this purpose, the output of the photodiode 850 is an input of ADC 842. ADC 842, thereby, obtains information about the occurrence of any non-linearity of the scan velocity of the laser 804. Based on this information, the non-linearity can be subtracted, such as by the response analyzer, from the results of the measurements of the measurement interferometer 844. Also note, the tunable laser 804 produces a trigger output 805 that is input to the ADC 842 for triggering the ADC 842.

In use, the polarization controller 826 imparts a defined polarization on the third laser beam 818, resulting in the polarized laser beam 819. With this defined polarization, the polarized laser beam 819 is coupled into the DUT 802. After passing the DUT 2, the polarized laser beam 819 is superimposed with the fourth laser beam 820, i.e., the reference arm of the Mach-Zehnder interferometer 844. The resulting first superimposed beam 830 is then coupled into the polarization beam splitter 832, which results in the seventh laser beam 834 and the eighth laser beam 836. Beams 834 and 836 are orthogonal, polarized components of beam 830. These orthogonal polarized beams 834 and 836 are detected by the photodiodes 838 and 840, and the respective output signals of the photodiodes 838 and 840 are received by the ADC 842. With the signals received by the ADC 842, the response analyzer 530 is able to determine two (complex) elements of the Jones matrix of the DUT 802.

The remaining two elements of the Jones matrix of the DUT 802 are obtained by changing the polarization of the polarized laser beam 819 with the polarization controller 826 and performing the aforementioned steps in a second run, for example. The changed polarization of the resulting polarized laser beam (not shown) preferably is orthogonal to the polarization of the polarized laser beam 819 of the first run. Thus, it is possible to calculate the missing two elements of the Jones matrix of the DUT 802. With the complete Jones matrix, optical characteristics of the DUT 802, such as PMD, DGD and PSPs can be determined. Note, additional information regarding interferometric determination of optical characteristics is presented in U.S. patent application Ser. No. 09/940,741, entitled, "Determination of Properties of an Optical Device," filed Aug. 28, 2001, which claims priority to European Patent Application Ser. No. 01125089.3, filed on Nov. 17, 2000, both of which are incorporated herein by reference.

Determining PDL

In addition to, or in lieu of, determining PMD, embodiments of the invention can enable PDL, e.g., maximum and minimum insertion losses ($L_{max}$ and $L_{min}$), to be determined. In at least some of these embodiments, this can be accomplished even in situations where the noise level of the measurements is comparable to the level of the PDL of the DUT. Note, an optical system, such as optical system 10 of FIG. 8, can be used for obtaining the DUT measurements.

Once DUT measurements are obtained, PDL can be determined using a Jones matrix, for example. Given a transfer matrix, T, as follows:

$$T = e^{i\phi}\begin{pmatrix} u_{11} & u_{12} \\ u_{21} & u_{22} \end{pmatrix} = e^{i\phi}\underline{U}, \quad (4)$$

the Jones matrix $\underline{U}$ can be used to obtain PDL (in decibels) according to the equation:

$$PDL = 10 \log_{10}(L_+/L_-) \quad (5)$$

where $L_+$ is the maximum insertion loss and $L_-$ is the minimum insertion loss, and where $$L_{+,-} = eig\{\underline{U}^{*t}\underline{U}\} \quad (6)$$

Here, $\underline{U}^{*t}$ is the complex conjugate transpose of the matrix $\underline{U}$. Thus, the maximum and minimum insertion losses of the DUT are given by the eigenvalues of the matrix $\underline{U}^{*t}\underline{U}$. As with PMD, the mathematical theory is correct, but errors can arise when noise associated with the measurements is present of the same magnitude as the PDL.

Recall that an eigenvector representing an extreme loss polarization state is associated with each eigenvalue. Mathematically, the PDL can be calculated using the eigenvalues associated with the two extreme polarizations, i.e., $P_+$ (associated with $L_+$) and $P_-$ (associated with $L_-$). This enables the measurement problem described above to be overcome by assigning each calculated eigenvalue to the proper $P_{+,-}$ before averaging occurs. However, the same measurement noise can lead to uncertainty in the determination of $P_+$ and $P_-$. In practice, this means that errors can be made in distinguishing the two extreme polarizations, especially for cases in which the PDL is relatively small, e.g., of the same order as the noise. An example of this effect was described previously with respect to FIG. 1 for PMD and will not be described in greater detail here. At least some embodiments of the invention are capable of alleviating this problem.

In this regard, in those embodiments of the test system of the present invention using Jones matrices, filtering of at least some of the phase and amplitude data associated with DUT responses can be accomplished before eigenvalues and eigenvectors are calculated. For instance, in some embodiments, the test systems calculate average values for at least some of the elements of $\underline{U}$ before attempting to calculate eigenvalues and eigenvectors of $\underline{U}^{*T}\underline{U}$. This can reduce the noise-level of data, thereby reducing the effect of the noise on calculations of $P_+$ and $P_-$ and PDL.

In other embodiments, filtering of at least some of the phase and amplitude data can be accomplished to determine which of the two losses obtained from a particular matrix (T) is to be assigned to the maximum loss polarization and which is to be assigned to the minimum loss polarization. In particular, an extreme polarization can be compared to one or more previously calculated extreme polarizations to determine the proper assignment.

Figure 9:
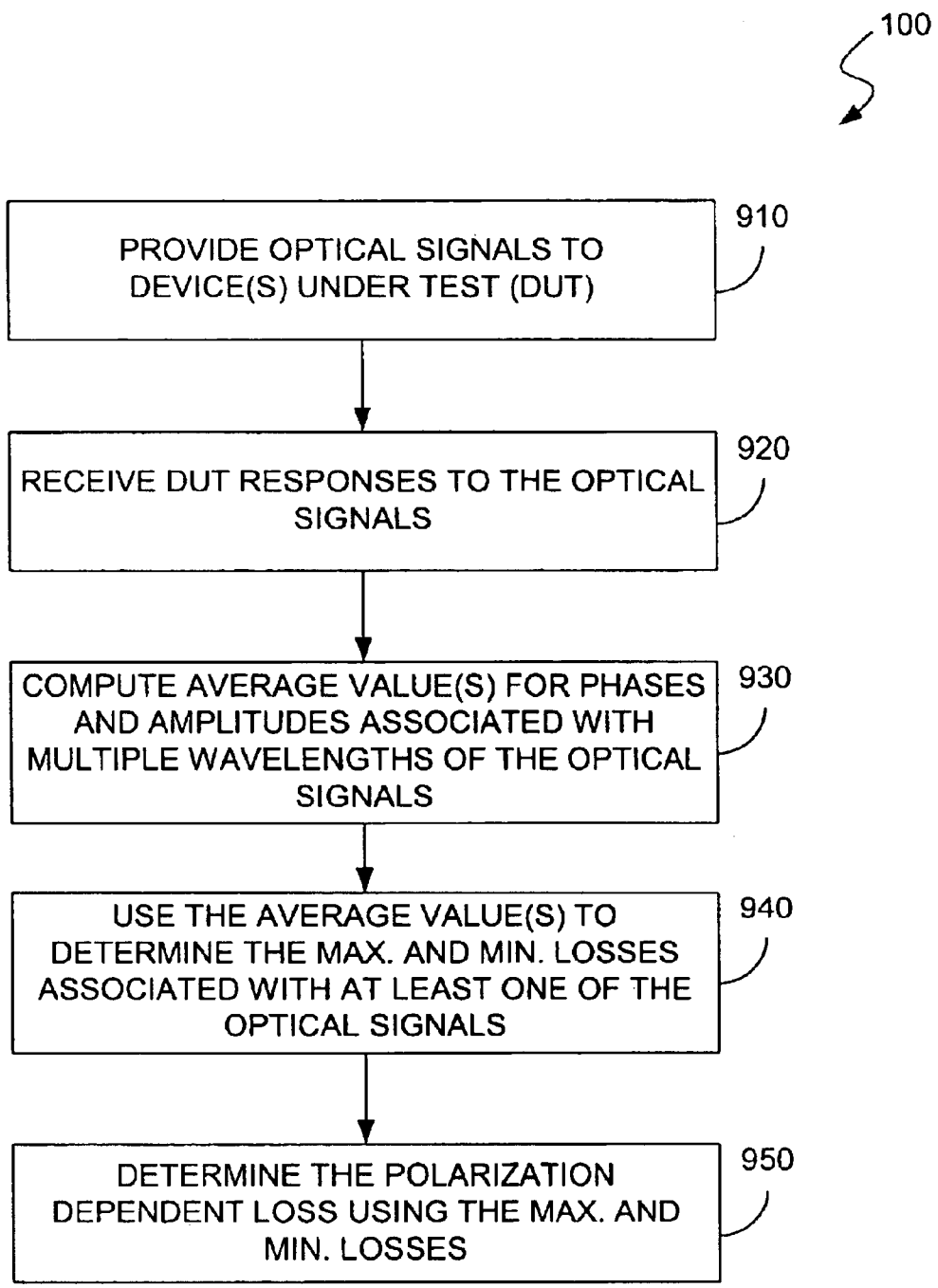
FIG. 9 is a flowchart depicting functionality that can be associated with the test system of FIG. 3.

Reference will now be made to the flowchart of FIG. 9, which depicts the functionality of an embodiment of a test system, such as test system 100 of FIG. 3, of the invention. As shown in FIG. 9, the functionality of the test system (or method) 100 may be construed as beginning at block 910, where optical signals are provided to a DUT. In block 920, the DUT responses to the optical signals are received. In block 930, average values are computed that corresponds to the phases and amplitudes associated with multiple wavelengths of the optic signals. Thereafter, such as depicted in block 940, the average values are used to determine the maximum and minimum losses associated with one of the optical signals. In block 950, the PDL of the optical signal is determined using the maximum and minimum insertion losses.

In Computing an average value (block 930), values corresponding to a particular element of a Jones matrix can be averaged over several wavelengths, for example. The average value then can be used for that Jones matrix element. In some embodiments, the values corresponding to multiple elements of a Jones matrix can be average values calculated over multiple wavelengths. Note, the wavelengths over which an average value is calculated for one element need not be the same wavelengths over which an average value is calculated for another element.

Figure 10:
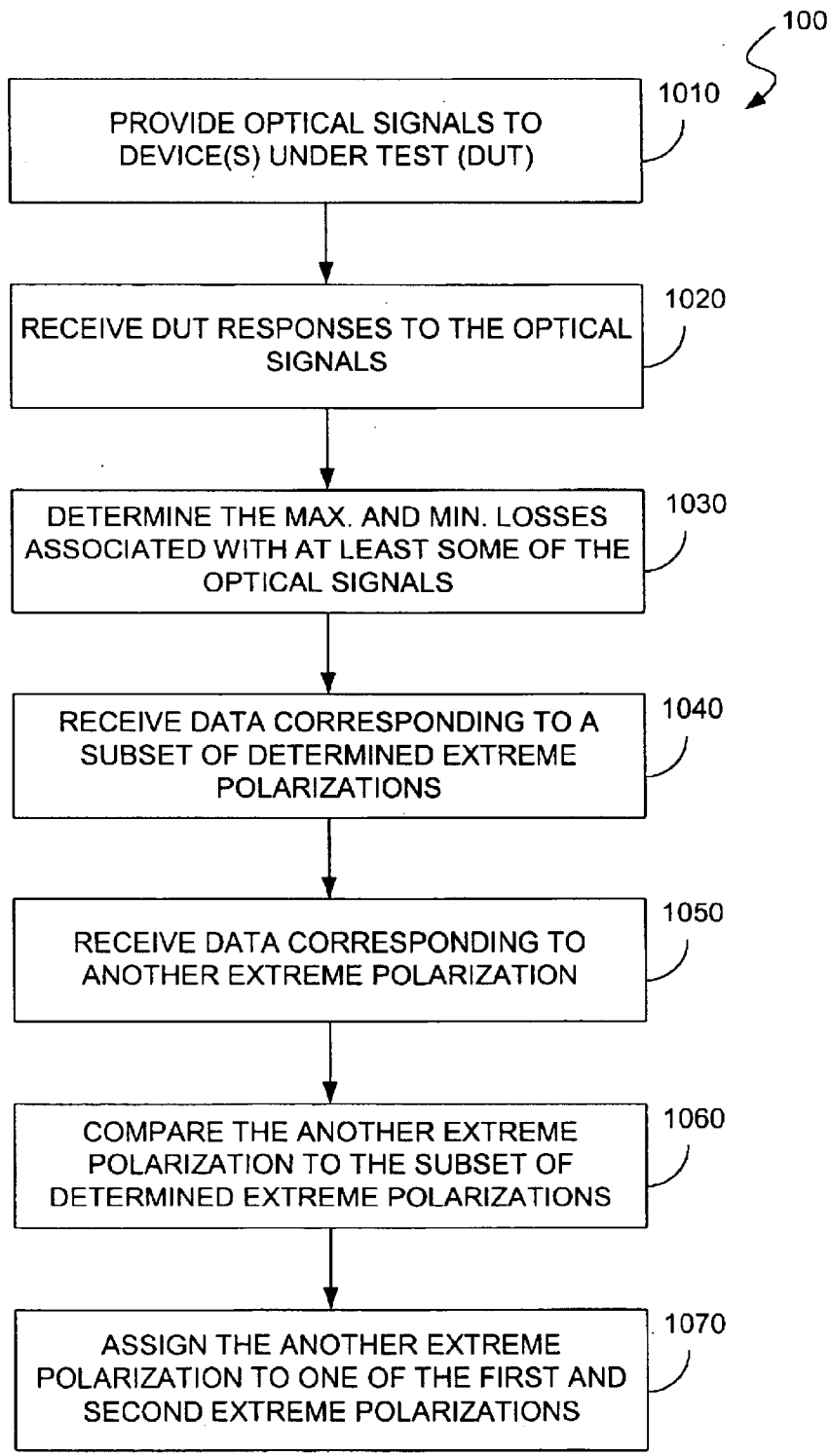
FIG. 10 is a flowchart depicting functionality that can be associated with the test system of FIG. 3.

Functionality of another embodiment of the test system is depicted in FIG. 10. As shown in FIG. 10, the functionality or method 100 may be construed as beginning at block 1010, where optical signals are provided to a DUT. In block 1020, the DUT responses to the optical signals are received. In block 1030, the maximum and minimum losses associated with at least some of the optical signals are determined. Proceeding to block 1040, data corresponding to a subset of determined extreme polarizations is received. In block 1050, another extreme polarization, e.g., a measured eigenvector, is received. Then, in block 1060, the measured extreme polarization is compared to the subset of previously measured extreme polarizations. Based on a relationship between this measured extreme polarization and the subset of the previously measured extreme polarizations, the extreme polarization can be assigned to one of $P_+$ and $P_-$, as depicted in block 1070.

Comparing the measured eigenvector to the eigenvector (s) associated with one or more previously measured extreme polarizations can enable proper polarization state assignment since the eigenvectors tend to evolve only over wavelength scales that are larger than the wavelength differences between sequentially measured extreme polarizations. For instance, eigenvectors associated with a previously determined extreme polarization can be compared to the measured eigenvectors associated with another optical signal. Assignment of each of the measured eigenvectors then can be accomplished by determining which one of the eigenvectors more closely aligns with the previously determined $P_+$ and/or which of the eigenvectors more closely aligns with the previously determined $P_-$.

In some embodiments, a "moving window" approach is used. In such an embodiment, eigenvectors assigned to $P_+$ and/or $P_-$ are averaged over a range of wavelengths. Assignment of each of the measured eigenvectors then can be accomplished by determining which one of the eigenvectors more closely aligns with the averaged $P_+$ and/or which of the eigenvectors more closely aligns with the averaged $P_-$.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated.

By way of example, embodiments of the invention can be adapted to provide filtering of both matrix elements (see FIGS. 6 and 9) and polarization states (see FIGS. 7 and 10). Additionally, although described here using interferometry to obtain measurements from a DUT, other techniques, such as polarimetry, can be used. Also, although use of Jones matrices has been particularly described here, determining values associated with optical characteristics of a DUT can be accomplished by other mathematical approaches. For example, Mueller matrices can be used. Use of Mueller matrices for determining PDL is described in B. M. Nyman and G. Wolter, "High-Resolution Measurement of Polarization Dependent Loss," IEEE Phot. Tech. Lett. 5, 817–818 (1993); and, S. Schmidt and C. Henschel, "PDL Measurements using the HP 8169A Polarization Controller," Agilent Technologies, PN 5964-9937E, both of which are incorporated herein by reference. All such modifications and variations are within the scope of the invention as determined by the appended claims when interpreted in accordance with the breadth to which they are fairly and legally entitled.

What is claimed is:

1. A method for determining optical characteristics of a device under test (DUT), said method comprising:
   receiving data corresponding to responses of the DUT to optical signals of different wavelengths;
   computing fast and slow group delays corresponding to at least some of the optical signals using the data received, the fast and slow group delays being attributable to first and second principle states of polarization; and
   assigning each of the fast and slow group delays to a correct one of the first and second principle states of polarization for at least some of the wavelengths.

2. The method of claim 1, further comprising:
   determining the differential group delay of the DUT corresponding to at least some of the optical signals.

3. The method of claim 1, wherein assigning each of the fast and slow group delays to the correct one of the first and second principle states of polarization is not inhibited by a differential group delay of the DUT exhibiting an order of magnitude comparable to an order of magnitude of noise associated with the receiving data step.

4. The method of claim 2, wherein determining the differential group delay step comprises:
   subtracting the fast group delay associated with a particular wavelength from the slow group delay associated with that wavelength.

5. The method of claim 1, wherein the assigning each of the fast and slow group delays step comprises:
   receiving data corresponding to a first subset of principle states of polarization of the DUT;
   receiving data corresponding to another principle state of polarization of the DUT; comparing the another principle state of polarization to the first subset of principle states of polarization; and
   assigning the another principle state of polarization to one of the first and second principle states of polarization based on a relationship determined during the comparing step.

6. The method of claim 1, wherein the data corresponding to the responses of the DUT are derived interferometrically.

7. The method of claim 1, wherein the computing fast and slow group delays step comprises:
   filtering subsets of the data received by reducing the wavelength resolution of the data; and
   using the subsets of data filtered to compute the fast and slow group delays.

8. The method of claim 7, wherein the filtering subsets of the data step comprises:
   computing an average value of at least some of the data associated with multiple wavelengths of the optical signals; and
   using the average value to compute the fast and slow group delays corresponding to one of the multiple wavelengths.

9. The method of claim 8, wherein the assigning each of the fast and slow group delays step comprises:
   receiving data corresponding to a first subset of principle states of polarization of the DUT;
   receiving data corresponding to another principle state of polarization of the DUT; comparing the another principle state of polarization to the first subset of principle states of polarization; and
   assigning the another principle state of polarization to one of the first and second principle states of polarization based on a relationship determined during the comparing step.

10. The method of claim 8, wherein the using the average value step comprises:
    providing a Jones matrix corresponding to the DUT and associated with the one of the multiple wavelengths;
    using the average value as an element of the Jones matrix; and
    determining the differential group delay of the DUT with respect to the one of the multiple wavelengths using the Jones matrix.

11. The method of claim 8, wherein the using the average value step comprises:
    providing a Mueller matrix corresponding to the DUT and associated with the one of the multiple wavelengths;
    using the average value as an element of the Mueller matrix; and
    determining the differential group delay of the DUT with respect to the one of the multiple wavelengths using the Mueller matrix.

12. The method of claim 1, further comprising:
    determining at least one of minimum insertion loss, maximum insertion loss and polarization dependent loss of the DUT.

13. The method of claim 1, further comprising:
    computing minimum and maximum insertion losses corresponding to at least some of the optical signals using the data received, the minimum and maximum insertion losses being attributable to first and second extreme states of polarization; and
    assigning each of the minimum and maximum insertion losses to a correct one of the first and second extreme states of polarization for at least some of the wavelengths.

14. The method of claim 13, wherein assigning each of the minimum and maximum insertion losses to the correct one of the first and second extreme states of polarization is not inhibited by a polarization dependent loss of the DUT exhibiting an order of magnitude comparable to an order of magnitude of noise associated with the receiving data step.

15. The method of claim 14, wherein the assigning each of the minimum and maximum insertion losses step comprises:
    receiving data corresponding to a first subset of extreme states of polarization of the DUT;
    receiving data corresponding to another extreme state of polarization of the DUT; comparing the another extreme state of polarization to the first subset of extreme states of polarization; and
    assigning the another extreme state of polarization to one of the first and second extreme states of polarization based on a relationship determined during the comparing step.

16. The method of claim 13, wherein the computing minimum and maximum insertion losses step comprises:
    computing an average value of at least some of the data associated with multiple wavelengths of the optical signals; and
    using the average value to compute the minimum and maximum insertion losses corresponding to one of the multiple wavelengths.

17. The method of claim 16, wherein the assigning each of the minimum and maximum insertion losses step comprises:
    receiving data corresponding to a first subset of extreme states of polarization of the DUT;
    receiving data corresponding to another extreme state of polarization of the DUT; comparing the another extreme state of polarization to the first subset of extreme states of polarization; and
    assigning the another extreme state of polarization to one of the first and second extreme states of polarization based on a relationship determined during the comparing step.

18. A method for determining optical characteristics of a device under test (DUT), said method comprising:
    receiving data corresponding to responses of the DUT to optical signals of different wavelengths;
    computing minimum and maximum insertion losses corresponding to at least some of the optical signals using the data received, the minimum and maximum insertion losses being attributable to first and second extreme states of polarization; and assigning each of the minimum and maximum insertion losses to a correct one of the first and second extreme states of polarization for at least some of the wavelengths.

19. The method of claim 18, wherein assigning each of the minimum and maximum insertion losses to the correct one of the first and second extreme states of polarization is not inhibited by a polarization dependent loss of the DUT exhibiting an order of magnitude comparable to an order of magnitude of noise associated with the receiving data step.

20. The method of claim 18, wherein the assigning each of the minimum and maximum insertion losses step comprises:

receiving data corresponding to a first subset of extreme states of polarization of the DUT;

receiving data corresponding to another extreme state of polarization of the DUT; comparing the another extreme state of polarization to the first subset of extreme states of polarization; and assigning the another extreme state of polarization to one of the first and second extreme states of polarization based on a relationship determined during the comparing step.

21. The method of claim 18, wherein the computing minimum and maximum insertion losses step comprises:

computing an average value of at least some of the data associated with multiple wavelengths of the optical signals; and using the average value to compute the minimum and maximum insertion losses corresponding to one of the multiple wavelengths.

22. The method of claim 21, wherein the assigning each of the minimum and maximum insertion losses step comprises:

receiving data corresponding to a first subset of extreme states of polarization of the DUT;

receiving data corresponding to another extreme state of polarization of the DUT; comparing the another extreme state of polarization to the first subset of extreme states of polarization; and assigning the another extreme state of polarization to one of the first and second extreme states of polarization based on a relationship determined during the comparing step.

23. The method of claim 18, further comprising:

determining at least one of fast group delay, slow group delay, differential group delay, first principle state of polarization and second principle state of polarization of the DUT.

24. A system for determining optical characteristics of a device under test (DUT), said system comprising:

a test system having a response analyzer wherein the response analyzer is operative to receive data corresponding to responses of a DUT to optical signals of multiple wavelengths, compute fast and slow group delays corresponding to at least some of the optical signals, each of the fast and slow group delays being attributable to first and second principle states of polarization, and assign each of the fast and slow group delays to a correct one of the first and second principle states of polarization for at least some of the wavelengths.

25. The system of claim 24, wherein an ability of the response analyzer to assign each of the fast and slow group delays to the correct one of the first and second principle states of polarization is not inhibited by the differential group delay of the DUT exhibiting an order of magnitude comparable to an order of magnitude of noise associated with the data received.

26. The system of claim 24, wherein the response analyzer is operative to determine differential group delays of the DUT corresponding to at least some of the optical signals, each of the differential group delays being determined by subtracting a fast group delay from a corresponding slow group delay.

27. The system of claim 24, further comprising:

a tunable optical source optically communicating with the DUT and operative to provide the optical signals to the DUT.

28. The system of claim 24, further comprising:

means for providing the optical signals to the DUT.

29. The system of claim 24, further comprising:

a polarization controller optically communicating with the DUT and operative to impart selected polarizations to the optical signals provided to the DUT.

30. The system of claim 24, wherein the response analyzer is operative to compute minimum and maximum insertion losses corresponding to at least some of the optical signals using the data received, the minimum and maximum insertion losses being attributable to first and second extreme states of polarization, and assign each of the minimum and maximum insertion losses to a correct one of the first and second extreme states of polarization for at least some of the wavelengths.

31. The system of claim 24, wherein, in assigning each of the fast and slow group delays, the response analyzer is operative to receive data corresponding to a first subset of principle states of polarization of the DUT, receive data corresponding to another principle state of polarization of the DUT, compare the another principle state of polarization to the first subset of principle states of polarization, and assign the another principle state of polarization to one of the first and second principle states of polarization based on a relationship determined during the comparing.

32. The system of claim 24, wherein, in computing the fast and slow group delays corresponding to the optical signals, the response analyzer is operative to compute an average value of at least some of the data associated with at least some of the optical signals, and use the average value to compute the fast and slow group delays corresponding to one of the optical signals.

33. A system for determining optical characteristics of a device under test (DUT), said system comprising:

a test system having a response analyzer, the response analyzer being operative to receive data corresponding to responses of a DUT to optical signals of multiple wavelengths, compute minimum and maximum insertion losses corresponding to at least some of the optical signals using the data received, the minimum and maximum insertion losses being attributable to first and second extreme states of polarization, and assign each of the minimum and maximum insertion losses to a correct one of the first and second extreme states of polarization for at least some of the wavelengths.

34. The system of claim 33, wherein an ability of the response analyzer to assign each of the minimum and maximum insertion losses to the correct one of the first and second extreme states of polarization is not inhibited by the polarization dependent loss of the DUT exhibiting an order of magnitude comparable to an order of magnitude of noise associated with the data received.

35. The system of claim 33, further comprising:
a tunable optical source optically communicating with the DUT and operative to provide the optical signals to the DUT.

36. The system of claim 33, further comprising:
a polarization controller optically communicating with the DUT and operative to impart selected polarizations to the optical signals provided to the DUT.

37. The system of claim 33, wherein the response analyzer is operative to compute fast and slow group delays corresponding to at least some of the optical signals, each of the fast and slow group delays being attributable to first and second principle states of polarization, and assign each of the fast and slow group delays to a correct one of the first and second principle states of polarization for at least some of the wavelengths.

38. The system of claim 33, wherein, in assigning each of the minimum and maximum insertion losses, the response analyzer is operative to receive data corresponding to a first subset of extreme states of polarization of the DUT, receive data corresponding to another extreme state of polarization of the DUT, compare the another extreme state of polarization to the first subset of extreme states of polarization, and assign the another extreme state of polarization to one of the first and second extreme states of polarization based on a relationship determined during the comparing.

39. The system of claim 33, wherein, in computing the minimum and maximum insertion losses corresponding to the optical signals, the response analyzer is operative to compute an average value of at least some of the data associated with at least some of the optical signals, and use the average value to compute the minimum and maximum insertion losses corresponding to one of the optical signals.

40. A computer-readable medium for determining optical characteristics of a device under test (DUT), said computer-readable medium comprising:
logic configured to receive data corresponding to responses of the DUT to optical signals;
logic configured to compute fast and slow group delays corresponding to at least some of the optical signals using the data received, the fast and slow group delays being attributable to first and second principle states of polarization; and
logic configured to assign each of the fast and slow group delays to a correct one of the first and second principle states of polarization for at least some of the optical signals.

41. The computer-readable medium of claim 40, further comprising:
logic configured to determine the differential group delays of the DUT corresponding to at least some of the optical signals.

42. The computer-readable medium of claim 40, further comprising:
logic configured to determine at least one of minimum insertion loss, maximum insertion loss and polarization dependent loss of the DUT.

43. A computer-readable medium for determining optical characteristics of a device under test (DUT), said computer-readable medium comprising:
logic configured to receive data corresponding to responses of the DUT to optical signals;
logic configured to compute minimum and maximum insertion losses corresponding to at least some of the optical signals using the data received, the minimum and maximum insertion losses being attributable to first and second extreme states of polarization; and
logic configured to assign each of the minimum and maximum insertion losses to a correct one of the first and second extreme states of polarization for at least some of the optical signals.

44. The computer-readable medium of claim 43, further comprising:
logic configured to determine at least one of fast group delay, slow group delay, differential group delay, first principle state of polarization and second principle state of polarization of the DUT.

45. A method for determining optical characteristics of a device under test (DUT), the method comprising:
providing to the DUT, optical signals comprising a plurality of wavelengths, the DUT having a transfer function comprising a transfer matrix T;
receiving in a test receiver, a plurality of responses from the DUT, the plurality of responses corresponding to the plurality of wavelengths;
computing a plurality of derivatives $dT/d\omega$ from the plurality of responses;
filtering the plurality of derivatives by computing a plurality of average values;
using the plurality of average values to identify a fast group delay;
using the plurality of average values to identify a slow group delay; and using the fast and slow group delays to compute a differential group delay of the DUT.

* * * * *

UNITED STATES PATENT AND TRADEMARK OFFICE
CERTIFICATE OF CORRECTION

PATENT NO. : 6,943,891 B2
DATED : September 13, 2005
INVENTOR(S) : VanWiggeren

It is certified that error appears in the above-identified patent and that said Letters Patent is hereby corrected as shown below:

Column 11,
Line 7, after "wherein" insert -- the --.
Line 29, delete "reducing" and insert -- degrading --.

Column 12,
Line 54, delete "receiving" before "data".

Column 14,
Line 11, after "of the" delete "differential".

Signed and Sealed this

Fourteenth Day of February, 2006

JON W. DUDAS
*Director of the United States Patent and Trademark Office*